(12) United States Patent
Kenar

(10) Patent No.: US 8,679,365 B1
(45) Date of Patent: Mar. 25, 2014

(54) CARBONATE PHASE CHANGE MATERIALS

(71) Applicant: The United States of America, as represented by the Secretary of Agriculture, Washington, DC (US)

(72) Inventor: James A. Kenar, East Peoria, IL (US)

(73) Assignee: The United States of America as represented by the Secretary of Agriculture, Washington, DC (US)

( * ) Notice: Subject to any disclaimer, the term of this patent is extended or adjusted under 35 U.S.C. 154(b) by 0 days.

(21) Appl. No.: 13/716,359

(22) Filed: Dec. 17, 2012

Related U.S. Application Data

(62) Division of application No. 12/780,434, filed on May 14, 2010, now Pat. No. 8,354,040.

(51) Int. Cl.
*C09K 5/06* (2006.01)
*C09K 5/00* (2006.01)
*C09K 5/02* (2006.01)

(52) U.S. Cl.
USPC .................. 252/71; 165/104.11; 165/104.12; 165/104.15; 165/104.17; 165/104.19; 165/104.21; 252/70; 252/73

(58) Field of Classification Search
USPC .............. 252/70, 71, 73; 165/104.11, 104.12, 165/104.15, 104.17, 104.19, 104.21
See application file for complete search history.

(56) References Cited

U.S. PATENT DOCUMENTS

2003/0170549 A1* 9/2003 Murai ........................... 429/329
2008/0132438 A1* 6/2008 Hoffman et al. .............. 510/380

OTHER PUBLICATIONS

Tyagi et al, "PCM Thermal Storage in Buildings: A State of Art", Renewable and Sustainable Energy Reviews, 11 (6): 1146-1166 (2007).*

* cited by examiner

*Primary Examiner* — Anthony J Green
(74) *Attorney, Agent, or Firm* — John Fado; Robert D. Jones; Lesley Shaw

(57) ABSTRACT

Phase change materials that include oleochemical carbonates absorb and release latent heat upon changing phases from solid to liquid (melting) or from liquid to solid (solidifying). The oleochemical carbonates are prepared from oleochemical alcohols derived from animal fats and vegetable oils or other bio-based substances. These oleochemical carbonates have melting temperatures with a relatively high heat of fusion and are non-corrosive. Oleochemical carbonates can be mixed together in various proportions to adjust melting/solidification temperature ranges as required by a particular application.

9 Claims, 9 Drawing Sheets

| Carbonate | Formula (Mw) | Melting | | | Crystallization | | | DSC scan rate (°C/min) | Principle peak shape | Effective % latent heat of total[a] |
|---|---|---|---|---|---|---|---|---|---|---|
| | | Onset melting temp. (°C) | Peak melting temp. (°C) | Latent heat of melting (J/g) | Onset freezing temp. (°C) | Peak freezing temp. (°C) | Latent heat of freezing (J/g) | | | |
| Decyl (4a) | C₂₁H₄₂O₃ (342.56) | -5.9 | -2.2 | 144 | -5.8 | -6.3 | 146 | 3 | sharp | 100(100) |
| Dodecyl (4b) | C₂₅H₅₀O₃ (398.37) | 17.3 | 19.3 | 200 | 14.7 | 14.3 | 199 | 5 | sharp | 100(100) |
| Tetradecyl (4c) | C₂₉H₅₈O₃ (454.44) | 31.8 | 33.7 | 227 | 29.6 | 28.7 | 229 | 5 | sharp | 100(100) |
| Hexadecyl (4d) | C₃₃H₆₆O₃ (510.50) | 43.1 | 44.9 | 219 | 40.7 | 40.3 | 215 | 3 | Broad doublet | 74(66) |
| Octadecyl (4e) | C₃₇H₇₄O₃ (566.56) | 46.4 | 51.6 | 223 | 47.2 | 46.9 | 222 | 3 | doublet | 65(65) |

[a]Numbers in parentheses correspond to the latent heat of freezing.

Fig. 2

CARBONATE PHASE CHANGE MATERIALS

CROSS-REFERENCE TO RELATED APPLICATIONS

This is a continuation of U.S. patent application Ser. No. 12/780,434 which was filed on May 14, 2010 and issued on Jan. 15, 2013 as U.S. Pat. No. 8,354,040, which is hereby incorporated by reference herein in its entirety.

FIELD OF THE INVENTION

The present invention relates to novel compositions used as phase change materials. Specifically, the invention relates to oleochemical-based carbonates or their mixtures used as phase change materials for heat storage.

BACKGROUND OF THE INVENTION

In a world that places a premium on sustainable energy production and energy conservation, the use of phase change materials (PCM) to moderate temperature and climatic conditions has made them an important commodity. Phase change materials are designed to release or absorb energy at predictable temperatures and, thereby, maintain an associated space or structure within a predetermined temperature range.

Generally, when the ambient temperature increases a solid-liquid PCM absorbs sensible heat. When the PCM reaches the temperature at which it undergoes its phase transition (i.e. the temperature at which the PCM material-changes from a solid state to a liquid state), the PCM temperature stops increasing and substantially maintains a constant phase change temperature. This is an endothermic process and the PCM "absorbs" the heat being applied thereto and stores it as latent heat in the material's chemical bonds.

"Latent heat" is the heat gained by a substance during a phase change without any accompanying rise in the temperature of the substance. In essence, it is the amount of heat necessary to change a substance from the solid state to the liquid state. Once the phase change material has completely changed to a liquid state, the temperature of the (now liquid) PCM begins to rise again as the applied heat is absorbed as sensible heat.

In the reverse process, as the ambient temperature decreases the PCM drops in temperature as it releases the excess sensible heat which was absorbed beyond the phase change temperature. At the phase change temperature, the PCM returns to its solid phase releasing the latent heat back to the environment at the phase change temperature of the PCM. As before, the PCM maintains a substantially constant temperature at its phase change temperature while giving up the stored latent heat.

The heat absorption and release properties of PCM can be harnessed to store and release thermodynamic energy as required for a specific application. There is particular interest in PCM that can maintain various temperatures between $-20°$ C. and $150°$ C. PCMs may be used in building materials such as walls, flooring, ceiling panels and solar heat storage systems, as well as heating, ventilating, and air conditioning (HVAC) applications. Other potential applications for PCM include: thermal energy storage, waste heat recovery, off peak power utilization, heat pump efficiency, space exploration, computer/electrical component cooling, food storage containers, and clothing and textiles.

Most current PCM is based on paraffin waxes and similar materials derived from petroleum. These materials have relatively high heats of fusion, low vapor pressure, and no phase separation. However, despite these desirable properties petroleum-based PCMs suffer from low thermal conductivity, moderate flammability, and large volume changes during phase transition. Further, materials derived from pure paraffin waxes are expensive and non-biodegradable. Pure paraffins are frequently mixed with lower grade hydrocarbons to control cost. However, the performance of the resulting hydrocarbon mix-based PCM is significantly degraded.

Only a few non-petroleum based PCMs have been seriously studied. Although fatty acids and their esters have suitable melting points and heat of fusion values, fatty acids are corrosive and are generally less efficient than petroleum-based equivalents.

The need exists for a bio-based PCM that exhibits performance qualities at least equivalent to current petroleum-based PCMs. The current invention comprises a non-corrosive oleochemical carbonate PCM with performance that is comparable to petroleum-based PCMs. The PCM of the current invention has a lower cost and is derived from renewable agricultural products and is therefore more environmentally friendly than the current petroleum-based alternative.

SUMMARY OF THE INVENTION

The current invention is directed to PCM comprising oleochemical carbonate, wherein the PCM comprises materials used for energy management that absorb and release latent heat upon changing phases from solid to liquid (melting) or from liquid to solid (solidifying).

The invention is also directed to a process for storage of heat comprising heat transfer to and from a heat storage medium whereby the heat storage medium changes phase as it absorbs or releases heat. The heat storage medium comprises oleochemical carbonate.

The invention is further directed to a process of making PCM. The process comprises the steps of: (a) providing an oleochemical carbonate, and (b) forming the oleochemical carbonate into a PCM.

BRIEF DESCRIPTION OF THE DRAWINGS

FIG. 2 is a table describing the thermal characteristics of selected oleochemical carbonates as determined by differential scanning calorimeter (DSC).

DETAILED DESCRIPTION OF PREFERRED EMBODIMENTS

The current invention comprises oleochemical-based carbonates or their mixtures as novel compositions for use as phase change materials. Unexpectedly, the inventor has found that oleochemical carbonates comprise an excellent source of phase change materials.

For the purpose of this disclosure, "phase change materials" (PCMs) are defined as materials used for energy management that absorb and release latent heat upon phase hanging from solid to liquid (melting) or liquid to solid (solidifying).

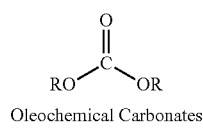

Oleochemical Carbonates
R = C8-C22 Carbon Chain

For the purposes of this disclosure, oleochemical carbonates (shown above) are materials prepared from oleochemical alcohols derived from animal fats and vegetable oils or other bio-based substances. These oleochemical carbonates have melting temperatures with relatively high heats of fusion and are non-corrosive. Oleochemical carbonates can be mixed together in various proportions to adjust melting/solidification temperature ranges as required by a particular application. In the preferred embodiment, an oleochemical mixture contains an at least 1% by weight oleochemical carbonate based on the total weight of the mixture. In alternative embodiments, the oleochemical carbonate mixture may contain any amount of oleochemical carbonate.

The oleochemical carbonates of the current invention are stable and biodegradable and have heat of fusion values that are generally higher than fatty acids. The inventor has found that oleochemical carbonates used as a phase change medium are capable of repeated heating and cooling cycles without any loss of effectiveness as a heat storage medium and appear to have minimal volume expansion on phase change.

Figure 1:
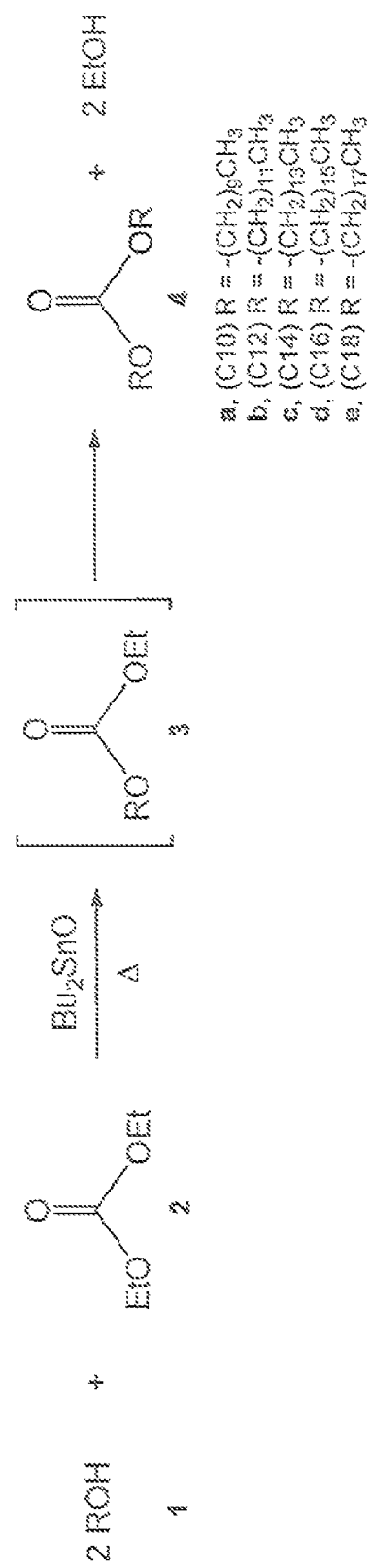
FIG. 1 generally describes the scheme used to prepare oleochemical carbonates from fatty alcohols and diethyl carbonate via dialkyl carbonate interchange reaction.

Oleochemical carbonates are prepared from commercially available oleochemical alcohols (fatty alcohols) ranging in chain length from approximately 8 to 22 carbon atoms, each chain extending from an opposite side of the carbonate structure. Typically, fatty alcohols are reacted in a carbonate interchange reaction with methyl or ethyl carbonate to obtain the desired oleochemical carbonates. Oleochemical carbonates may also be derived by multiple other means that are well known in the art. FIG. 1 shows the general scheme used to prepare oleochemical carbonates 4a-e from renewable fatty alcohols 1 and diethyl carbonate 2 via a dialkyl carbonate interchange reaction FIG. 2 comprises a Table showing a summary of the heat release properties of some selected pure oleochemical carbonates 4a-e.

Oleochemical carbonate heat transfer properties can be modified by mixing the pure oleochemical materials to customize the resulting properties to match a desired application. By mixing, two or more of the oleochemical carbonates eutectic mixtures can be obtained whereby the temperature of the phase change can be tailored to specific temperatures. Smaller (C5-C7) and larger (greater than C22) alcohol chains can also be used to prepare the carbonates and extend the temperature ranges of the phase change materials. Thus, energy absorbed or released can be predicted based on the composition of the material and PCM to deliberately seek to take advantage of these absorption/release actions.

Experimentally Derived Data

The data disclosed in FIGS. 2-8 was derived using the methods and materials described infra.

Oleochemical carbonates were prepared and purified following published procedures using fatty alcohols decanol (C10-capryl alcohol), dodecanol (C12-lauric alcohol), tetradecanol (C14-myristyl alcohol), hexadecanol (C16-palmityl alcohol), and octadecanol (C18-stearyl alcohol) and reagents. The purity of the carbonates was checked by gas chromatography (GC) and/or nuclear magnetic resonance (NMR) spectroscopy and all the carbonates utilized had purities greater than 95%.

A Mettler AE100 balance (Mettler Instrument Company, NJ) was calibrated and used for weighing all Differential Scanning Calorimeter (DSC) samples. Approximately 5.0-10.0 (±0.1) mg of a powdered sample was weighed into an aluminum DSC pan and hermetically sealed. The samples were then immediately analyzed by DSC. All thermal properties of the oleochemical carbonates such as melting, crystallization, and latent heats were conducted using a TA instruments (New Castle, Del.) model 2920 V4.3 A DSC calibrated against an indium standard. Data sampling and temperature controls were fully automated and controlled by the "TA Instrument Control" software program.

The sealed DSC samples were run under a constant $N_2$ stream flowing at 50 mL/min and referenced against an identical empty aluminum pan. The samples were first cycled through the temperature range of interest above and below the sample's melting and freezing point to distribute the materials evenly throughout the DSC pans and eliminate temperature history effects.

The samples were then cooled to a temperature of −10 to −15° C. where sample solidification was considered complete. The sample was held isothermally for 1 min at −10 to −15° C. and then heated with a linear heating rate ($\beta$) of 3-5° C./min to a temperature appropriate to obtain a complete melting profile for the sample. The sample was then cooled back to −10 to −15° C. at the same rate used to heat the sample to obtain a complete solidification profile for the sample.

Heat flow (W/g) versus temperature (° C.) curves from each scan was analyzed using TA Universal Analysis 2000 software, version V4.3 A (TA Instruments, DE). Latent heats were obtained by numerical integration of the area over which a thermal event occurred and is demarcated as the difference between the onset and the baseline offset temperature of that event. The onset temperature was taken as the temperature obtained by fitting a straight line of the rising part of the peak. Peak melting ($T_M$) and solidification ($T_C$) points were taken at the peak of the DSC curve. Exothermic signals from DSC are reported in the upward direction.

Thermogravimetric analysis was used to investigate the change in mass of oleochemical carbonates due to decomposition or evolution of volatiles when these compounds were subjected to heating under nitrogen. TGA experiments were performed on a 2050 TGA (TA Instruments, New Castle, Del.). Samples, approximately 10 mg, were run at a heating rate of 10° C./min from 25 to 800° C. All samples were run in a nitrogen atmosphere with a flow rate of 90 mL/min. The onset temperature ($T_{Onset}$) and temperature at maximum weight percent loss ($T_{MaxWt\%}$) were obtained by taking the derivative (weight % over temperature) over the TGA curve. $T_{Onset}$ was taken as the temperature obtained by fitting a straight line to the lower temperature side of the derivative peak while $T_{MaxWt\%}$ was taken at the maximum of the derivative peaks.

Figure 3:
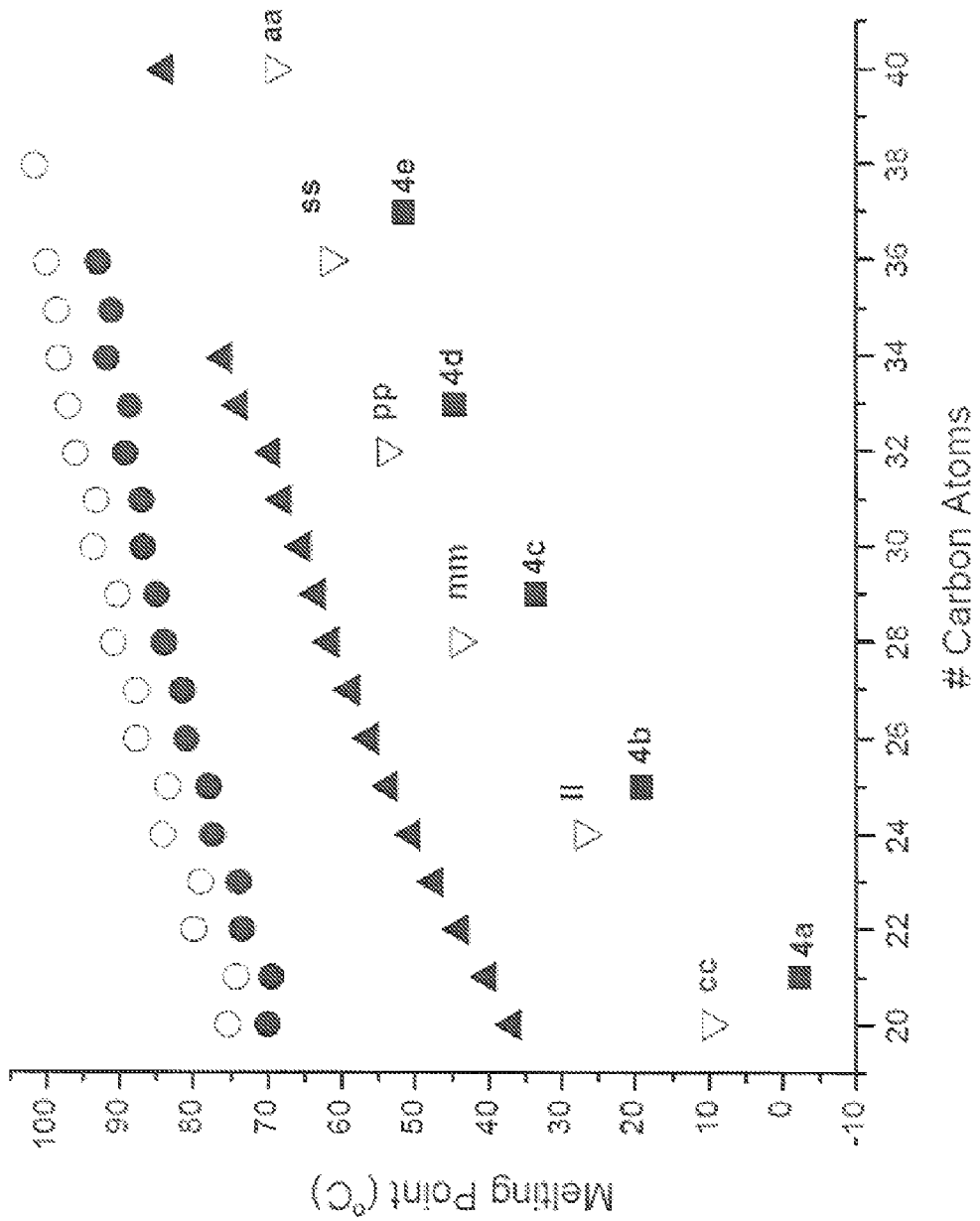
FIG. 3 shows melting point curves versus the number of carbon atoms for the selected oleochemical carbonates.

The melting points of symmetrical oleochemical carbonates 4a-e versus the number of carbon atoms present in the molecules are presented in FIG. 3. As can be seen for these carbonates (■), which all contain an odd number of carbon atoms, there is a smooth increase in their melting points from −3 to 52° C. as the number of carbon atoms increased. For comparison, literature derived melting points for a series of saturated fatty acids (○), fatty alcohols (•), n-alkanes (▲), and symmetrical wax esters (▽) containing similar numbers of carbon atoms are also depicted in FIG. 3. Immediately apparent is that the carbonates have lower melting points than comparable fatty acid, fatty alcohol, n-alkane, or wax ester series containing similar numbers of carbon atoms. The large difference in the melting points between the carbonates and either the saturated fatty acid or alcohol series (42-73° C.) is likely attributable to the carbonate's inability to intermolecularly hydrogen bond as is possible for the fatty acids and alcohols.

It is well known that the melting points between homologous long-chain compounds alternate between molecules containing an even and odd number of carbon atoms and that the difference between melting points become smaller as the chain length increases. This slight melting point alternation can be observed in the shorter chain fatty acids and alcohols of these series shown in FIG. 3. It is interesting to note the carbonate compounds also melt approximately 7-12° C. lower than the melting points of comparable wax esters.

Based on the small alternation differences observed for the melting points in the fatty acids and alcohols containing even and odd carbon atoms, it seems unlikely the 7-12° C. differences in melting points observed between the carbonate and wax ester series can be attributed solely to the fact that the carbonate series contain only an odd number of carbon atoms while the wax esters contain only an even number of carbon atoms. In addition to the slight alternation phenomena, the difference in melting points between the carbonate and wax ester series must also result from inherent differences between the carbonate (ROCOOR) and ester (ROCOR) moieties.

The additional ether-like oxygen atom present in the carbonate functionality relative to the ester group appears to change the intermolecular geometric and/or electronic interactions between the long alkyl chains in the carbonates. This disruption further weakens the ability of the carbonates to intermolecularly stack as tightly as the corresponding ester compounds, thereby, lowering the melting points of the carbonates relative to the wax ester series.

This notion is further substantiated by comparison of the carbonate and wax ester series to the n-alkane series. The alkane series, which contains no polar functionality, melts higher than either the wax ester or carbonate series indicating that both the ester and carbonate moieties in these series disrupts the geometric and intermolecular packing of the long alkyl chains, albeit to different extents.

Figure 4:
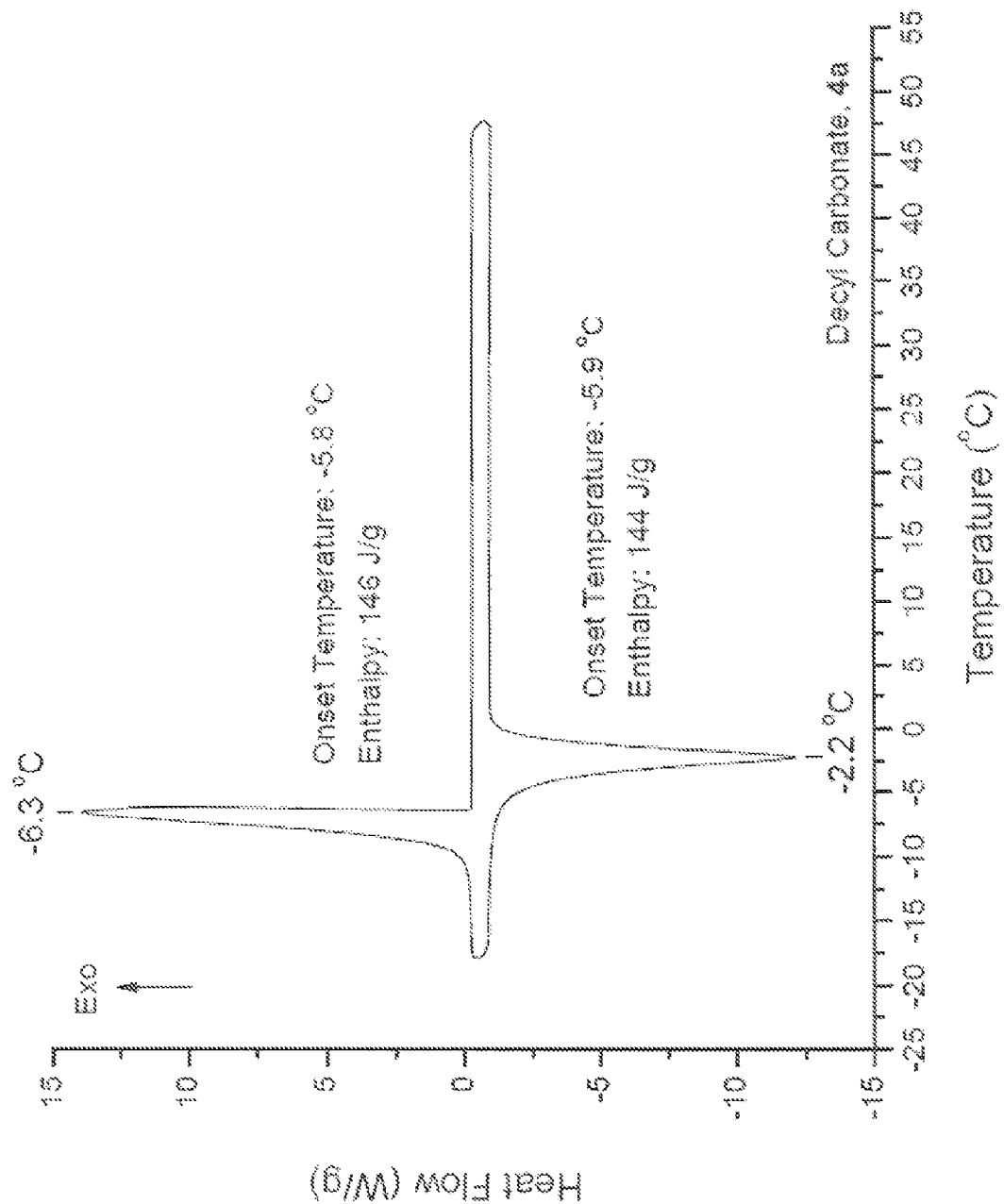
FIG. 4 is a DSC thermogram of decyl carbonate at $3°$ C./min.
Figure 5:
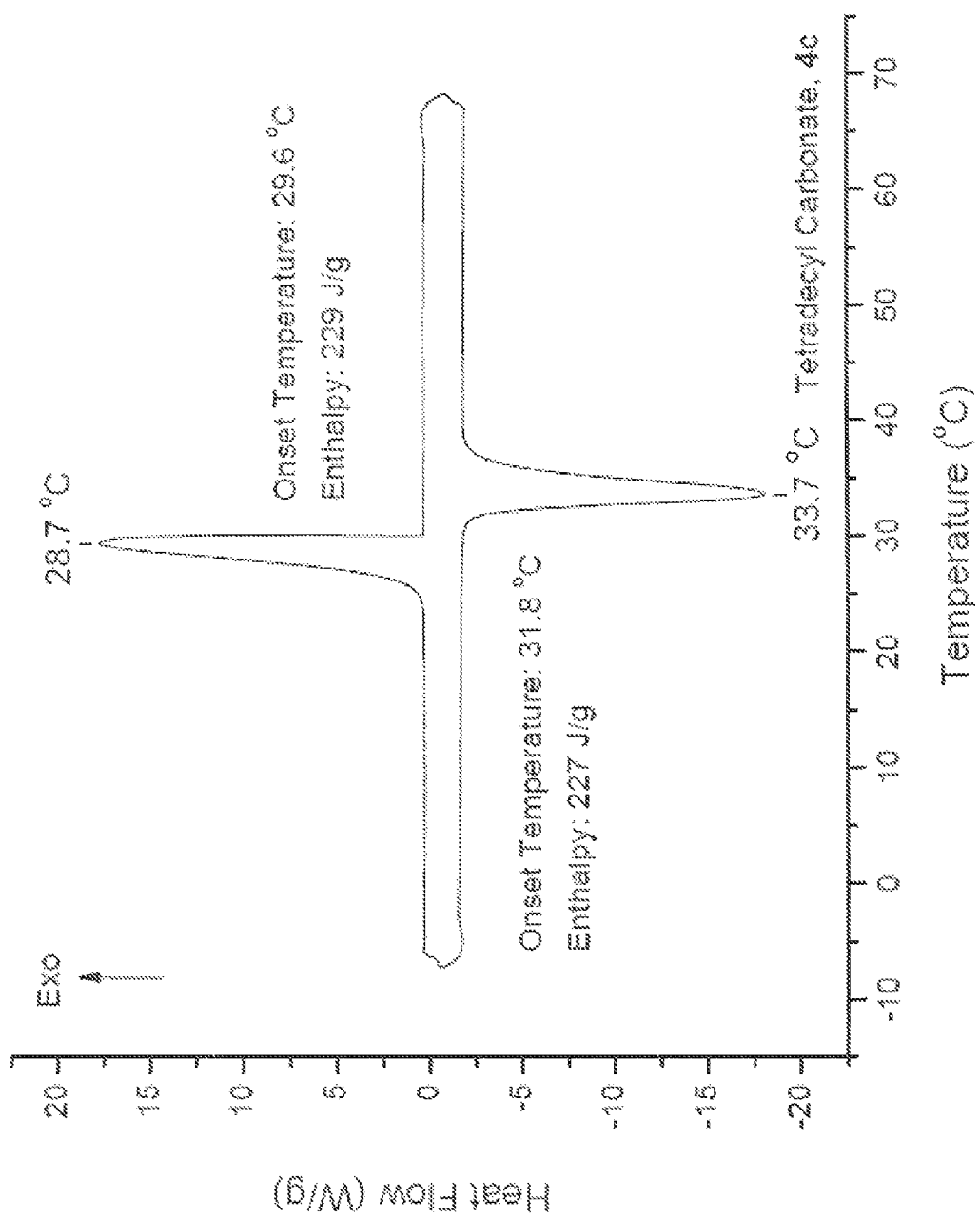
FIG. 5 is a DSC thermogram of tetradecyl carbonate at $5°$ C./min.
Figure 6:
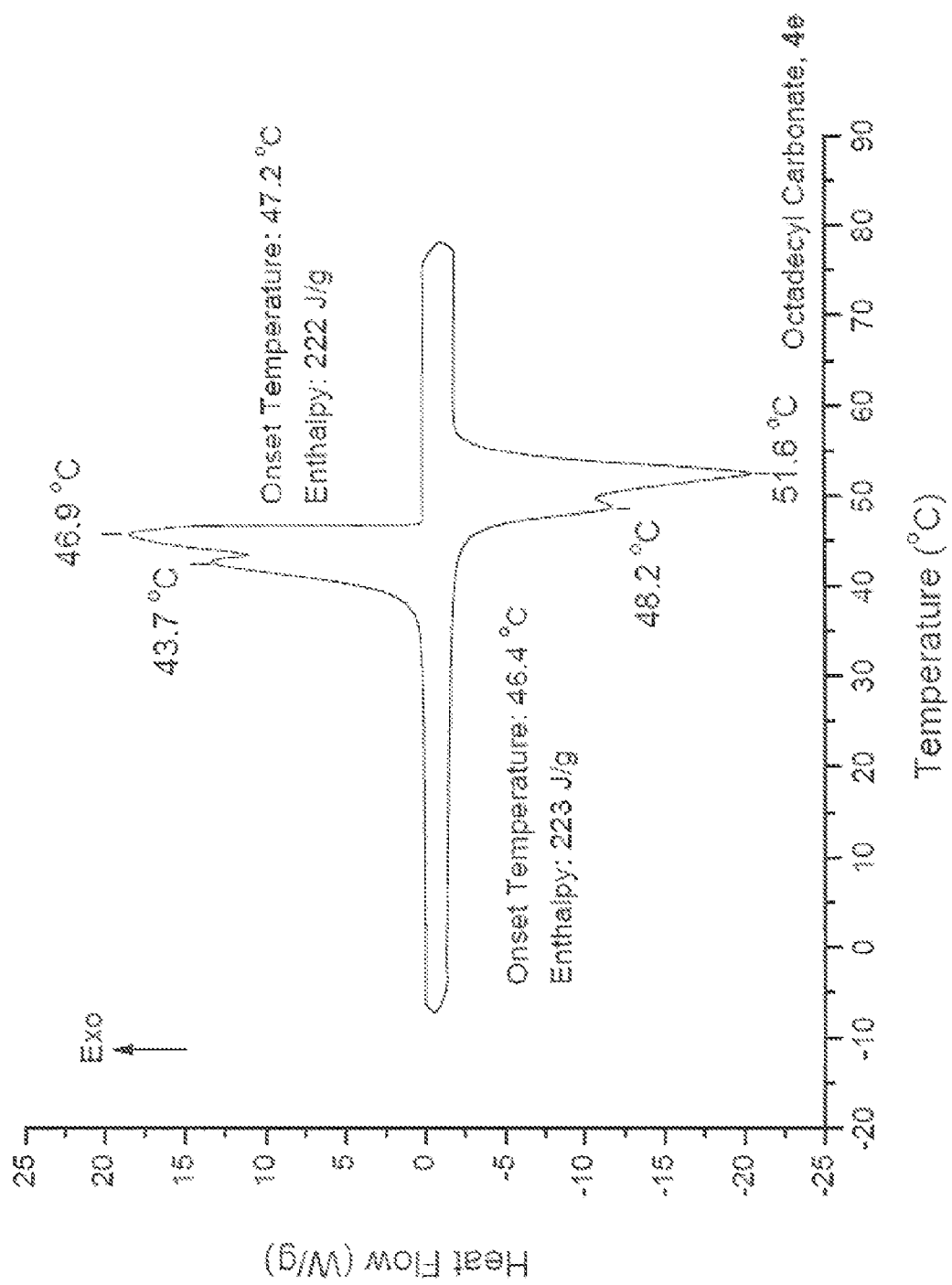
FIG. 6 is a DSC thermogram of octadecyl carbonate at $3°$ C./min.

FIGS. 4-6 show the heating and cooling DSC thermograms for decyl, tetradecyl, and octadecyl carbonate, 4a, 4c, and 4e, respectively. The table shown in FIG. 2 summarizes the thermal characteristics obtained from the thermograms for selected carbonates. The carbonates had good latent heat storage capacities of >190 J/g with the exception of decyl carbonate which was somewhat lower possessing a latent heat of melting and freezing of approximately 145 J/g.

As can be seen from the thermograms (FIGS. 4 and 5) and the table in FIG. 2, the total latent heats of melting of 4a and 4c were 144 and 227 J/g, respectively, while their latent heats of freezing were 146 and 229 J/g, respectively. Carbonates 4a-c showed melting and freezing phase transitions as sharp well defined peaks. Octadecyl carbonate 4e (FIG. 5) had a total latent heat of melting and freezing of 223 and 222 J/g, respectively.

In contrast to 4a-c, the thermograms of hexadecyl carbonate 4d (thermogram not shown) and octadecyl carbonate 4e (FIG. 6) showed a principal peak in addition to an overlapping subsidiary peak. The table in FIG. 2 also records the peak shape of the principle peak and presence of subsidiary peaks observed during the melting and solidification transitions as well as the percentage of latent heat contained within the primary peak. For 4d and 4e, these overlapping peaks accounted for 100 percent of the total heat transition.

Figure 7A:
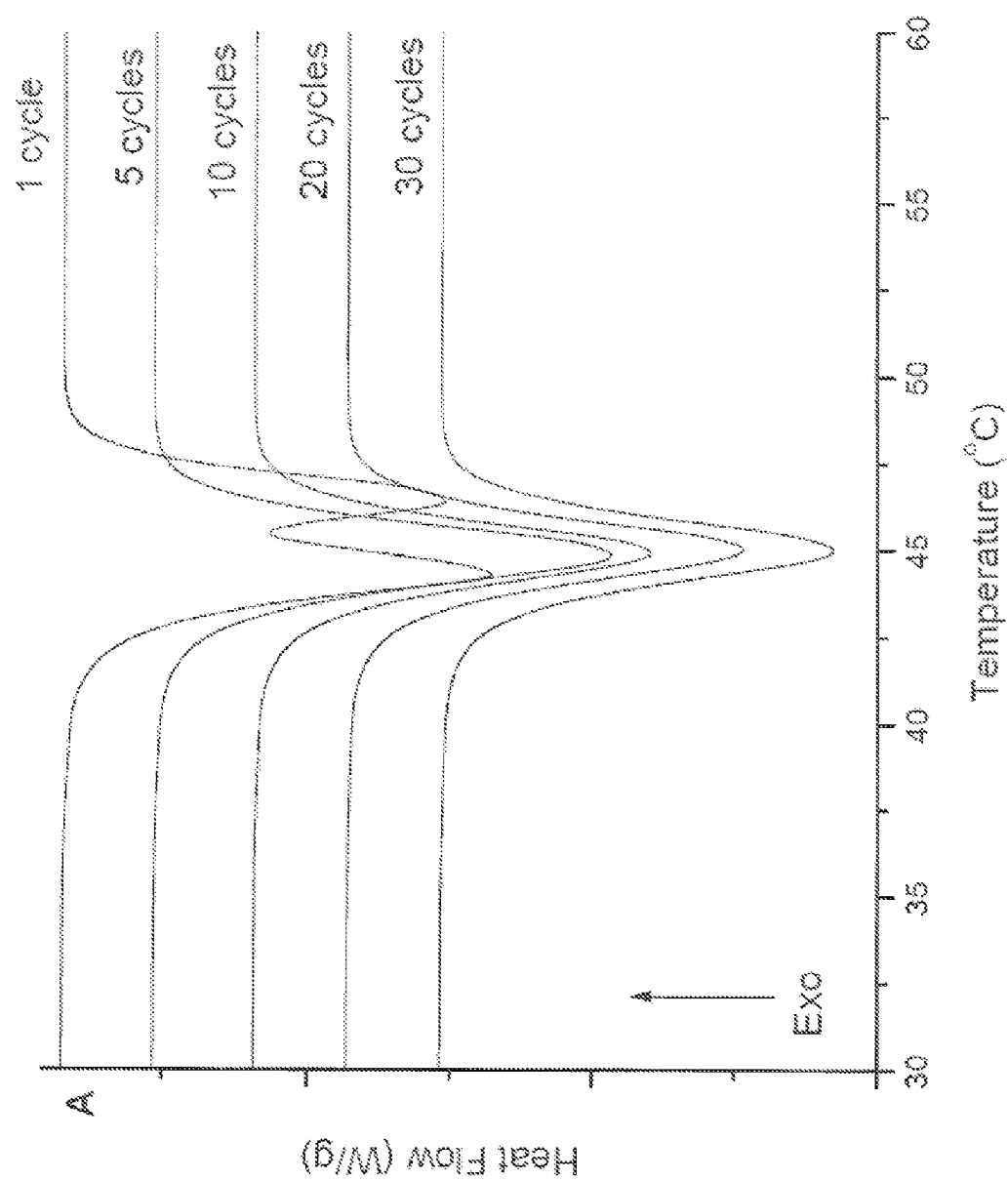
FIG. 7A is a DSC thermal cycling thermogram for hexadecyl carbonate showing the melting transition.
Figure 7B:
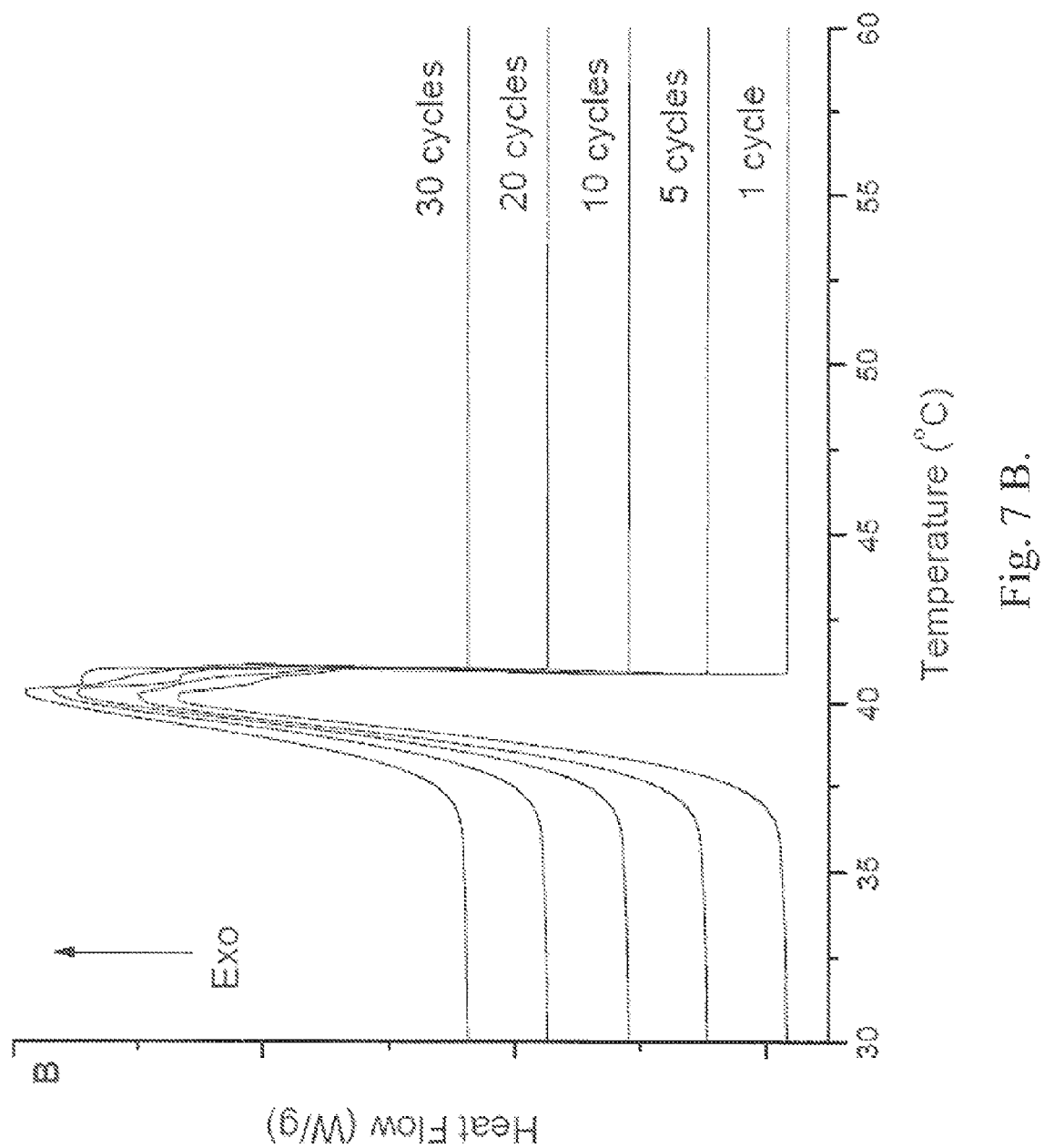
FIG. 7B is a DSC thermal cycling thermogram for hexadecyl carbonate showing the solidification transition.

FIGS. 7A and 7B show the DSC curves for melting and solidification transitions of hexadecyl-carbonate 4d after 1, 5, 10, 20, and 30 thermal cycles scanned at a rate of 3° C./min. The first scan cycle in the melting transition was different from those in the following cycles (FIG. 7A). The first cycle showed two overlapping transitions, the principal and subsidiary peaks at approximately 44° C. and 46° C., respectively, similar to that observed for octadecyl carbonate, 4e (FIG. 5). This was likely due to differing thermal history because as the scan cycles progressed the two peaks coalesced into one peak with a maximum melting point of 44.9° C. ($T_{onset}$=43.1° C.).

Throughout the scan cycles, the solidification transition showed one main transition with a maximum solidification point of 40.3° C. ($T_{onset}$=40.7° C.) which had a slight shoulder visible (FIG. 7B). After 30 cycles the latent heats for the melting and solidification transitions were each 209.8 J/g. The latent heats did not change significantly from their initially observed values of 219 and 215 J/g for melting and solidification, respectively. This suggests that no chemical degradation of the hexadecyl carbonate occurred during thermal cycling and the carbonate would likely have good thermal reliability as PCMs for latent heat storage applications.

When octadecyl carbonate, 4e, was cycled through 30 cycles at 3° C./min, the inventor found that the two initial overlapping peaks observed during the first cycle, as shown in FIG. 6, did not change over 30 cycles. The total latent heat for these overlapping peaks after 30 cycles (217 J/g melting, 216 J/g freezing) did not change significantly from their initially observed values of 223 and 222 J/g for melting and solidification, respectively.

Figure 8:
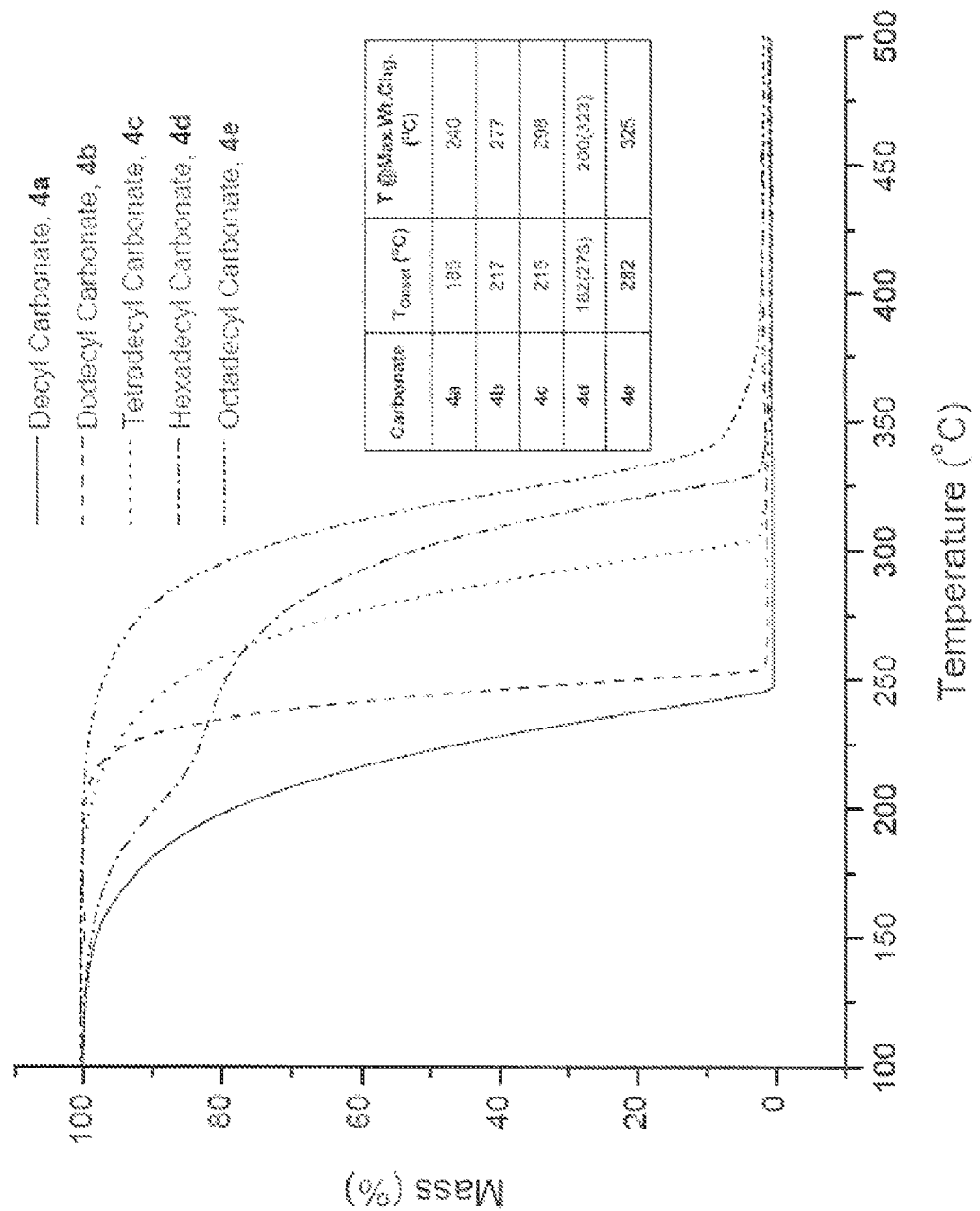
FIG. 8 is a thermogravimetric curve of the selected oleochemical carbonates.

The thermogravimetric analysis curves for the oleochemical carbonates are shown in FIG. 8. All the carbonates decomposed cleanly in one distinguishable step except for hexadecyl carbonate, 4d, which decomposed in two distinguishable steps. The decomposition onset temperatures and the decomposition peak temperatures for the carbonates are given in the table inset in FIG. 8. As can be seen, as the number of carbon atoms in the homologous carbonate's series increased, the thermal stability of the carbonates also increased.

CONCLUSIONS

A series of symmetrical oleochemical carbonates containing 21-31 carbon atoms, derived from renewable fatty alcohols through a carbonate interchange reaction, were examined for their potential as phase change materials. The transition temperatures and latent heats of melting and solidification were determined using DSC analyses and these carbonates were shown to perform well with the heat being adsorbed and released over short temperature intervals.

The examined oleochemical carbonates had melting and freezing transition temperatures ranging from −2° C. to 53° C. which was significantly lower than fatty acids, fatty alcohols, n-alkanes, and wax esters containing comparable number of carbon atoms. The majority of the carbonates possessed sharp transitions and high latent heats without supercooling and thermal cycling showed the carbonates to have stable transitions with reliable thermal properties.

These carbonates represent novel renewable-based PCM chemicals that compliment fatty acids, fatty alcohols and their fatty acid esters and provide viable bio-based alternatives to paraffin wax and salt hydrate PCM. It can be envisioned that by changing the carbonate's chain length, and/or forming eutectic mixtures of these compounds the temperature ranges over which these carbonates can be effectively tailored to meet a PCM application's need.

For the foregoing reasons, it is clear that oleochemical carbonates unexpectedly represent a new class of renewable bio-based PCM. The use of oleochemical carbonates as PCM opens up an important degree of freedom to synthesize bio-based PCM chemicals over a greater range of temperatures not currently available by current bio-based PCM such as fatty acids.

The current invention may be modified and customized as required by a specific operation or application, and the individual components may be modified and defined, as required, to achieve the desired result. Such variations are not to be regarded as a departure from the spirit and scope of the invention, and all such modifications as would be obvious to one skilled in the art are intended to be included within the scope of the following claims.

What is claimed is:

1. A phase change material (PCM), the PCM comprising oleochemical carbonate, wherein the PCM comprises a material used for energy management that absorbs and releases latent heat upon changing phases from solid to liquid (melting) or from liquid to solid (solidifying).

2. The PCM of claim 1 wherein the PCM comprises at least one percent by weight oleochemical carbonate.

3. The PCM of claim 1 wherein the PCM comprises decyl carbonate.

4. The PCM of claim 1 wherein the PCM comprises dodecyl carbonate.

5. The PCM of claim 1 wherein the PCM comprises tetradecyl carbonate.

6. The PCM of claim 1 wherein the PCM comprises hexadecyl carbonate.

7. The PCM of claim 1 wherein the PCM comprises octadecyl carbonate.

8. The PCM of claim 1 wherein the PCM comprises an oleochemical carbonate mixture.

9. The PCM of claim 1 wherein a phase change occurs between −6° C. and 60° C.

* * * * *